(12) United States Patent
Kim et al.

(10) Patent No.: US 12,469,916 B2
(45) Date of Patent: Nov. 11, 2025

(54) BATTERY MODULE AND ASSEMBLY METHOD THEREOF

(71) Applicant: SK On Co., Ltd., Seoul (KR)

(72) Inventors: Ji San Kim, Daejeon (KR); Hae Ryong Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 14 days.

(21) Appl. No.: 18/527,804

(22) Filed: Dec. 4, 2023

(65) Prior Publication Data

US 2024/0194994 A1  Jun. 13, 2024

(30) Foreign Application Priority Data

Dec. 7, 2022 (KR) .................. 10-2022-0169881

(51) Int. Cl.
| | |
|---|---|
| *H01M 50/507* | (2021.01) |
| *H01M 10/653* | (2014.01) |
| *H01M 10/6551* | (2014.01) |
| *H01M 50/211* | (2021.01) |
| *H01M 50/24* | (2021.01) |
| *H01M 50/244* | (2021.01) |
| *H01M 50/258* | (2021.01) |
| *H01M 50/271* | (2021.01) |

(52) U.S. Cl.
CPC ......... *H01M 50/24* (2021.01); *H01M 10/653* (2015.04); *H01M 10/6551* (2015.04); *H01M 50/211* (2021.01); *H01M 50/244* (2021.01); *H01M 50/258* (2021.01); *H01M 50/271* (2021.01); *H01M 50/507* (2021.01)

(58) Field of Classification Search
None
See application file for complete search history.

(56) References Cited

U.S. PATENT DOCUMENTS

| | | | |
|---|---|---|---|
| 2010/0112429 A1* | 5/2010 | Murata ............ | H01M 10/6554 429/120 |
| 2011/0206968 A1* | 8/2011 | Nishimura .......... | H01M 10/647 429/120 |
| 2016/0233465 A1* | 8/2016 | Lee ..................... | H01M 10/625 |

(Continued)

FOREIGN PATENT DOCUMENTS

| | | | |
|---|---|---|---|
| DE | 102018213066 A1 * | 2/2020 | |
| KR | 101518189 B1 | 5/2015 | |

(Continued)

OTHER PUBLICATIONS

Hans et al., DE-102018213066 Machine Translation (Year: 2020).*

*Primary Examiner* — Ula C Ruddock
*Assistant Examiner* — Anna Korovina
(74) *Attorney, Agent, or Firm* — The Webb Law Firm

(57) ABSTRACT

The present disclosure relates to a battery module, including a cell assembly including one or more battery cells and a busbar assembly electrically connecting the one or more battery cells, a module case including an opening part at least partially opened on one surface, and forming an accommodating space for accommodating the cell assembly therein through the opening part, a module cover coupled to the module case to close the opening part, and a filling part which is provided between an outside of the busbar assembly and the module case and includes an electrically insulating material, and an assembly method thereof.

20 Claims, 11 Drawing Sheets

(56) References Cited

U.S. PATENT DOCUMENTS

| | | | | |
|---|---|---|---|---|
| 2018/0205124 A1* | 7/2018 | Lee | ................ | H01M 10/613 |
| 2019/0260099 A1* | 8/2019 | Ju | ................ | H01M 50/505 |
| 2020/0067040 A1* | 2/2020 | Kim | ................ | H01M 50/211 |
| 2021/0098760 A1* | 4/2021 | Jeon | ................ | H01M 10/613 |
| 2021/0408621 A1* | 12/2021 | Lee | ................ | H01M 10/647 |

FOREIGN PATENT DOCUMENTS

| | | | |
|---|---|---|---|
| KR | 1020160105358 A | | 9/2016 |
| KR | 101941115 B1 | | 1/2019 |
| KR | 102128588 B1 | | 7/2020 |
| KR | 20210129489 A | * | 10/2021 |
| WO | 2017110036 A1 | | 6/2017 |
| WO | 2021107429 A1 | | 6/2021 |
| WO | 2022146867 A1 | | 7/2022 |

* cited by examiner

⇒ : Gas discharge path

⇒ : Gas discharge path

BATTERY MODULE AND ASSEMBLY METHOD THEREOF

CROSS-REFERENCE TO RELATED APPLICATION

This application claims priority to Korean Patent Application No. 10-2022-0169881 filed Dec. 7, 2022, the disclosure of which is hereby incorporated by reference in its entirety.

BACKGROUND OF THE INVENTION

1. Field of the Invention

The present disclosure relates to a battery module comprising a secondary battery or a battery cell. More particularly, the present disclosure relates to filling an empty space of a module case with an electrically insulating or fire-retardant material.

2. Description of Related Art

Secondary batteries, unlike primary batteries, are not only capable of charging and discharging, but are also expanding their business areas into new application fields due to their advantages of environmental friendliness and economic feasibility (high capacity and long lifespan). With the increase of portable devices including mobile devices, electric vehicles, intelligent robot industries, and eco-friendly energy industries, the secondary battery industry, which is a core part of these industries, is also developing.

Among secondary batteries, lithium secondary batteries have outstanding advantages in capacity, weight, self-discharge and memory effect compared to conventional nickel-based batteries, such as nickel cadmium batteries or nickel hydride batteries, and thus dominate the entire secondary battery market.

An operating principle of the lithium secondary battery is an electrochemical oxidation-reduction reaction. In other words, it is the principle that electricity is generated by movement of lithium. In the case of a lithium secondary battery, the phenomenon in which lithium ions escape from the anode and go to the cathode through the electrolyte and separator is called discharging. The reverse process of the phenomenon is called charging.

However, social concerns about the safety of battery use are increasing due to recent fires or explosions occurring during the use of lithium secondary batteries. Due to these social concerns, one of the major development tasks of lithium secondary batteries in recent years is to eliminate instabilities such as fire and explosion due to thermal runaway of battery cells.

To this end, Korean Patent No. 10-1518189 discloses providing a thermal barrier between a plurality of battery cells. The thermal barrier is to block heat conduction to an adjacent cell and to form a heat conduction path as intended. However, during thermal runaway, there is a problem in that high-temperature water vapor is discharged through various paths such as a terrace part of a battery cell beyond the thermal barrier. In addition, a separate insulating member should be included to insulate between a busbar assembly and the case of a battery module inside the battery module, which results in a problem of increasing the size of the case of the battery module.

SUMMARY OF THE INVENTION

First, an object of the present disclosure is to mitigate thermal propagation between adjacent cells in a thermal runaway situation of a battery module.

Second, an object of the present disclosure is to discharge high-temperature gas generated during a fire in an intended direction.

Third, an object of the present disclosure is to reduce the size of a module case by eliminating the separate insulating member.

Fourth, an object of the present disclosure is to simplify an assembly process by reducing the number of parts when assembling the battery module and to increase productivity.

Fifth, an object of the present disclosure is to fill the inside of the battery module with various types of fillers having various characteristics.

To this end, the present disclosure is to fill an empty space of a battery module by utilizing a filler comprising or made of a fire-retardant material. In addition, since the filler is electrically insulated, it may replace a separate insulating member for electrical insulation inside the battery module.

In addition, in order to fill the filler, the present disclosure may provide a module case integrally formed by including an opening part in which at least a portion of one surface, particularly an upper surface, is opened.

Specifically, in accordance with an aspect of the present disclosure, there is provided a battery module comprising: a cell assembly comprising one or more battery cells and a busbar assembly electrically connecting the one or more battery cells; a module case comprising an opening part at least partially opened on one surface, and forming an accommodating space for accommodating the cell assembly therein through the opening part; a module cover coupled to the module case to close the opening part; and a filling part which is provided between an outside of the busbar assembly and the module case and comprises an electrically insulating material.

The busbar assembly may comprise a first busbar assembly and a second busbar assembly which are disposed on both sides of the one or more battery cells along a predetermined first direction perpendicular to a height direction of the module case and extend along a second direction perpendicular to the height direction of the module case and the first direction on both sides of the one or more battery cells based on the first direction.

The filling part may comprise a first filler filled between the module case and the first busbar assembly; and a second filler filled between the module case and the second busbar assembly.

The accommodating space may comprise a cell accommodating space in which the cell assembly is located; and a first space and a second space located outside the first busbar assembly and the second busbar assembly, and in which the first filler and the second filler are located, respectively.

The cell accommodating space may be filled with a material different from the first filler and the second filler.

When gas is generated in the cell accommodating space due to a temperature rise of the one or more battery cells, the first filler and the second filler may prevent the generated gas from moving to the first space and the second space.

Based on the first direction, a length of the first space may be different from a length of the second space or the same length.

In the module case, a length of the module case extending along the first direction may be longer than a height of the module case and a length of the module case extending along the second direction.

The module case may comprise a module lower panel forming a bottom surface of the accommodating space, and the module lower panel may further comprise a first bottom groove and a second bottom groove extending side by side along the second direction and provided with a predetermined insertion length.

The battery module may further comprise a heat dissipation part located between the first bottom groove and the second bottom groove, and contacting the one or more battery cells.

The heat dissipation part may comprise a heat dissipation layer applied on the module lower panel.

The first busbar assembly may comprise a first busbar electrically connected to the one or more battery cells; and a first frame supporting the first busbar in the accommodating space, and the second busbar assembly may comprise a second busbar electrically connected to the one or more battery cells; and a second frame supporting the second busbar in the accommodating space, and lower sides of the first frame and the second frame may be provided in shapes corresponding to the first bottom groove and the second bottom groove to be inserted into the first bottom groove and the second bottom groove, respectively.

Based on the first direction, a length of the filling part may be greater than a thickness of the first frame and the second frame.

The module case may further comprise a module first side panel and a module second side panel extending toward the module cover from both edges of the module lower panel parallel to the first direction, respectively, the module first side panel may comprise a first side groove and a second side groove, each of the first side groove and the second side groove independently having a predetermined assembly depth and connected to the first bottom groove, each extending along the height direction of the module case, and the module second side panel may comprise a third side groove and a fourth side groove, each of the third side groove and the fourth side groove independently having an assembly depth and connected to the second bottom groove, each extending along the height direction of the module case.

The first busbar assembly may comprise a first busbar electrically connected to the one or more battery cells; and a first frame supporting the first busbar in the accommodating space, and the second busbar assembly may comprise a second busbar electrically connected to the one or more battery cells; and a second frame supporting the second busbar in the accommodating space, wherein shapes of both edges of the first frame provided in the height direction of the module case may be provided to correspond to shapes of the first side groove and the second side groove so that the first frame is coupled to the first side groove and the second side groove, and shapes of both edges of the second frame provided in the height direction of the module case may be provided to correspond to shapes of the third side groove and the fourth side groove so that the second frame is coupled to the third side groove and the fourth side groove.

Each of the first side groove, the second side groove, the third side groove, and the fourth side groove may be provided in a tapered shape toward an outside of the module case in the accommodating space.

The filling part may further comprise a fire-retardant material.

The one surface of the module case comprising the opening part may be an upper surface of the module case.

In addition, in accordance with another aspect of the present disclosure, there is provided a battery module comprising: a cell assembly comprising one or more battery cells and a busbar assembly electrically connecting the one or more battery cells; a module case comprising an opening part at least partially opened on one surface, and forming an accommodating space therein to accommodate the cell assembly through the opening part; and a module cover coupled to the module case to close the opening part, wherein the accommodating space comprises a filling space which is located between the busbar assembly and the module case and in which a filling part formed of an electrically insulating material is located; and a cell accommodating space in which the cell assembly is located.

In addition, in accordance with another aspect of the present disclosure, there is provided an assembly method of a battery module comprising a cell assembly comprising one or more battery cells and a busbar assembly electrically connecting the one or more battery cells; and a module case forming an accommodating space for accommodating the cell assembly therein together with a module cover, the assembly method comprising: disposing a heat dissipation part on a bottom surface of the accommodating space; positioning the cell assembly in the accommodating space through an opening part in which at least a portion of one surface of the module case is opened; inserting or injecting a filling part formed of an electrically insulating material provided between an outside of the busbar assembly and the module case; and coupling the module cover to the module case to close the opening part.

First, according to the present disclosure, it is possible to mitigate thermal propagation between adjacent cells in a thermal runaway situation of a battery module.

Second, according to the present disclosure, it is possible to discharge high-temperature gas generated during a fire in an intended direction.

Third, according to the present disclosure, it is possible to reduce the size of the case of the battery module by removing a separate insulating member.

Fourth, according to the present disclosure, it is possible to simplify the assembly process and increase productivity by reducing the number of parts when assembling the battery module.

Fifth, according to the present disclosure, it is possible to fill different areas inside the battery module with fillers having different characteristics.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DESCRIPTION OF THE INVENTION

Figure 1A:
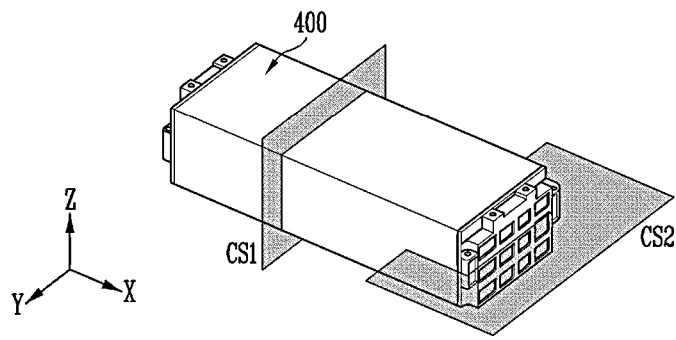
FIG. 1A is an example of a conventional prior art battery module.

Hereinafter, preferred embodiments of the present disclosure will be described in detail with reference to the accompanying drawings. A configuration or control method of a device to be described below is only for explaining an embodiment of the present disclosure, but is not intended to limit the scope of the present disclosure, and the same reference numerals used throughout the specification indicate the same components.

Specific terms used in herein are only for convenience of description and are not used as limitation of the exemplified embodiments.

For example, expressions such as "identical" not only indicate exactly the same state, but also indicate a state in which a tolerance, or a difference in the degree to which the same function is obtained exists.

For example, expressions indicating relative or absolute arrangements such as "in which direction", "along which direction", "side by side", "vertically", "centered", "concentric", or "coaxial" not only strictly indicate such arrangements, but also indicate a state of relative displacement with tolerance, or angle or distance to such an extent that the same function is obtained.

Hereinafter, the present disclosure will be described based on a spatial Cartesian coordinate system with X-axis, Y-axis, and Z-axis orthogonal to each other. Each axis direction (X-axis direction, Y-axis direction, Z-axis direction) refers to both directions in which each axis extends.

The X-direction, Y-direction, and Z-direction mentioned below are for explanation so that the present disclosure can be clearly understood, and each direction may be defined differently depending on where the reference is placed.

The use of terms such as 'first', 'second', and 'third' in front of the components mentioned below is only to avoid confusion of the components referred to, and is independent of the order, importance, or master-servant relationship between the components. For example, an invention comprising only the second component without the first component can be implemented.

Singular expressions used herein include plural expressions unless the context clearly dictates otherwise.

Figure 1B:
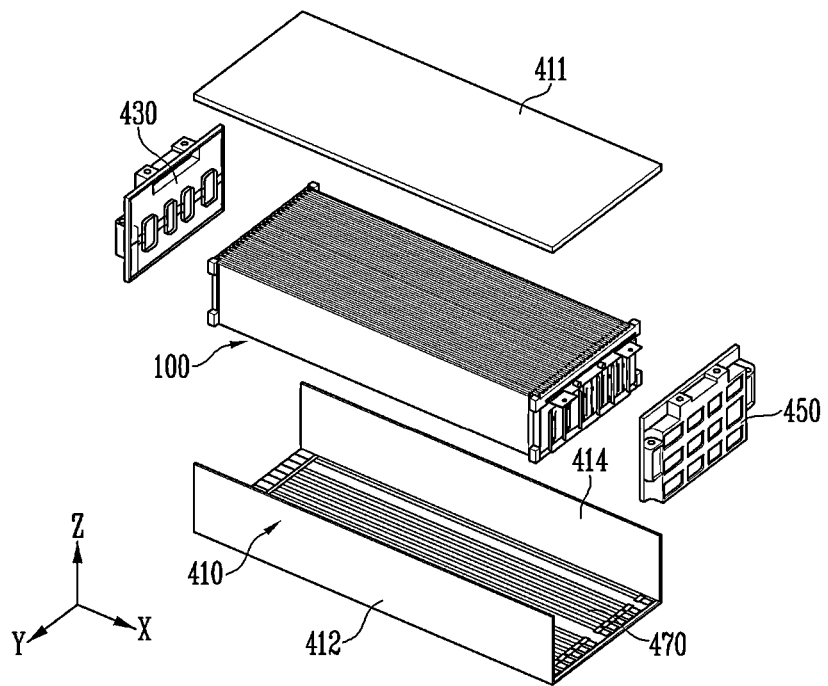
FIG. 1B is an exploded view of the battery module illustrated in FIG. 1A.

FIG. 1A illustrates a conventional prior art battery module 400. FIG. 1B is an exploded view of the conventional battery module 400.

A battery cell described herein refers to a basic unit of a lithium secondary battery, specifically, a lithium ion battery, which can be used by charging and discharging electric energy. The main components of the battery cell are a cathode, an anode, a separator, and an electrolyte, and these main components are put into a case (or pouch). The battery cell may further comprise a tab protruding out of the pouch and connected to the cathode and the anode, respectively, for electrical connection with the outside.

Meanwhile, the battery module described herein refers to a battery assembly in which the battery cells are put in a case after bundling in one or more numbers to protect from external shock, heat, vibration, and the like.

In addition, a battery pack refers to a set in which a predetermined number of battery modules are gathered for a finally desired voltage or power.

Referring to FIGS. 1A and 1B, the conventional battery module 400 may accommodate a cell assembly 100 comprising a plurality of battery cells (not shown) and a busbar assembly (not shown) provided at both ends of the plurality of battery cells along the X-direction to integrate and electrically connect the plurality of battery cells therein. In order to accommodate the cell assembly 100, the battery module 400 may comprise a cell accommodating body 410 having an angular U-shape with both ends opened along the X-direction and an upper surface opened, or a channel shape with the upper part opened, a cell accommodating cover 411 coupled to the upper part of the cell accommodating body 410, and a first cover 430 and a second cover 450 coupled to both ends of the cell accommodating body 410 opened in the X-direction.

The cell assembly 100 is a concept in which the one or more battery cells are stacked and comprises a busbar assembly provided for integrating and connecting tabs provided to each of the one or more stacked battery cells into one according to electrical polarity. In other words, the cell assembly 100 may refer to an assembly in which the one or more stacked battery cells and the busbar assembly are electrically connected.

In addition, the bus bar assembly refers to an assembly comprising a bus bar (not shown) electrically connected to a tab provided for each battery cell and a busbar frame (not shown) for supporting the busbar inside the battery module. The busbar may be formed of a metal having excellent electrical conductivity, and the busbar frame may be formed of an insulating material.

Referring to FIGS. 1A and 1B, the conventional battery module 400 may include a module housing (not shown) for accommodating the cell assembly 100. The module housing may include a cell accommodating body 410 provided in a U shape by bending both side edges of one panel toward the upper part.

Specifically, the cell accommodating body 410 may include a lower surface 470 that faces one side surface of the cell assembly 100 and supports the cell assembly 100, and a first side surface 412 and a second side surface 414 bent at both ends of the lower surface 470 and extending toward the cell accommodating cover.

As a result, the cell accommodating body 410 may have a shape in which the upper surface and both side surfaces that are bent are open. Accordingly, the module housing may have a closed hexahedral shape by coupling the first cover 430, the second cover 450, and the cell accommodating cover 411 with both side surfaces that are not-bent and the upper surface of the cell accommodating body 410, respectively.

The battery cell may be a secondary battery comprising a pouch-type secondary battery, a prismatic secondary battery, or a cylindrical secondary battery. In the present specification, the drawings illustrate the pouch-type secondary battery as an example, but are not limited thereto.

Figure 2A:
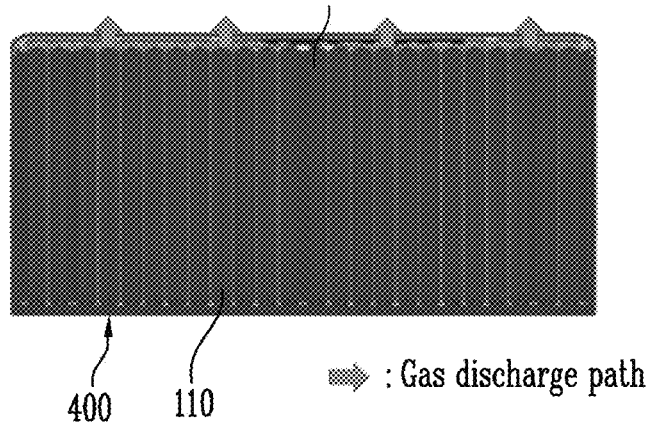
FIG. 2A is a cross-section of the conventional prior art battery module.
Figure 2B:
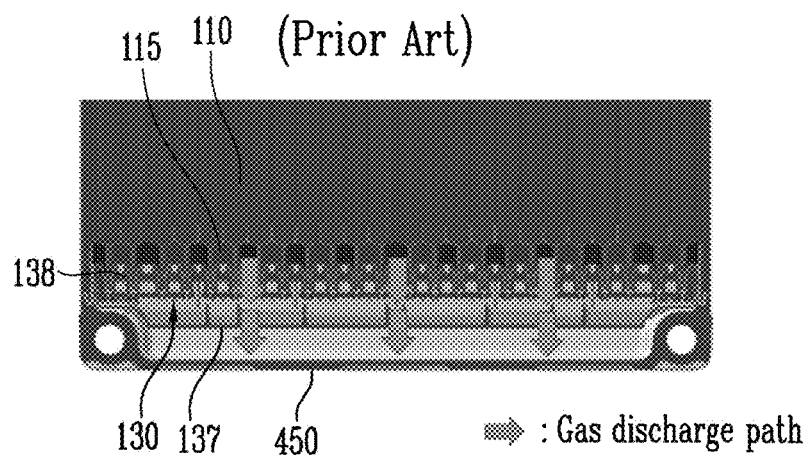
FIG. 2B is another cross-section of the conventional prior art battery module.

FIG. 2A illustrates a cross section of the battery module 400 when cut along one imaginary plane, CS1 (shown in FIG. 1A). FIG. 2B illustrates a cross section of the battery module 400 when cut along another imaginary plane, CS2 (shown in FIG. 1A).

Referring to FIG. 2A, an arrow indicates an ideal gas discharge path in case of fire. In order to prevent high-temperature heat from a battery cell that has undergone thermal runaway from propagating to an adjacent cell or to prevent the heat of a battery module that has a fire from spreading to an adjacent battery module, it will be preferable that after the gas generated in the event of a fire moves toward the cell accommodating cover 411, to discharge it to the outside through a gas discharge structure that may be provided in the cell accommodating cover 411, for example, a venting hole.

However, in the conventional battery module 400, unlike this ideal situation, gas may be discharged through various paths. Referring to FIG. 2B, gas may also be discharged through an empty space formed between the tab 115 provided at both ends of the battery cell 110 and the busbar assembly 130 electrically connected to the tab 115, and an empty space such as between the busbar assembly 130 and the second cover 450 or between the busbar assembly 130 and the first cover 430. In this case, heat due to the high-temperature gas is propagated to other battery cells, and continuous thermal runaway may occur.

In order to prevent such continuous thermal runaway or to delay thermal propagation, the present disclosure relates to filling an internal space of a battery module with a filler that is electrically insulating and has fire resistance.

Figure 3A:
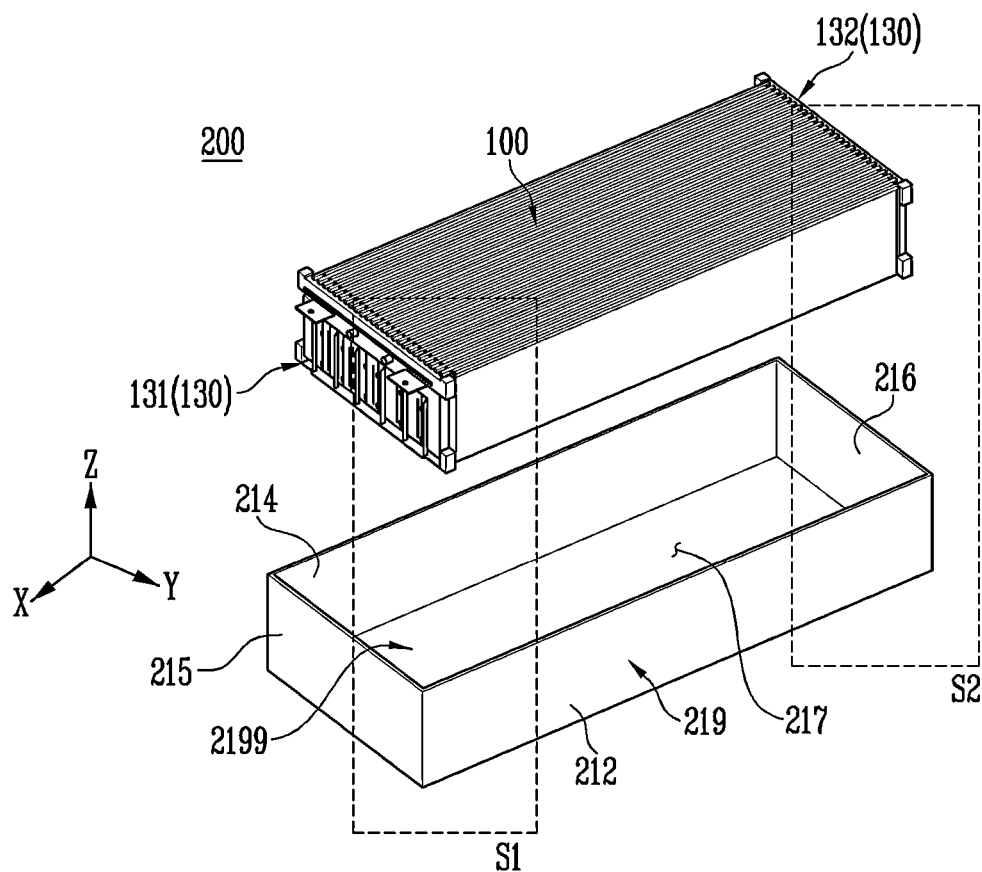
FIG. 3A is an example of a battery module described in the present disclosure.
Figure 3B:
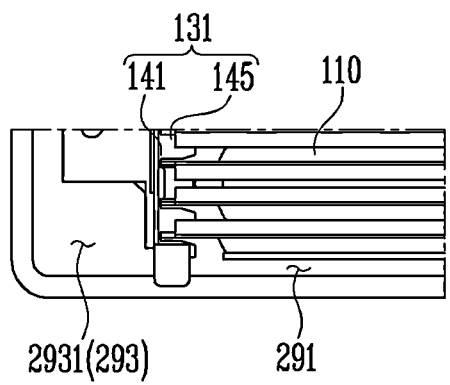
FIG. 3B illustrates a cross-section of S1 portion shown in FIG. 3A.
Figure 3C:
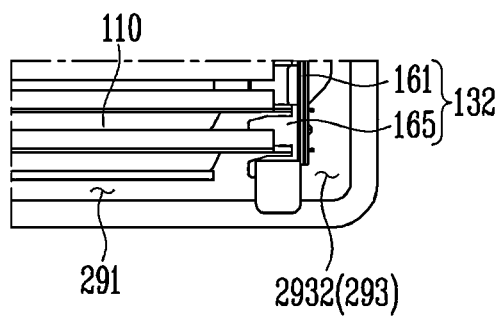
FIG. 3C illustrates a cross-section of S2 portion shown in FIG. 3A.

FIG. 3A relates to a battery module 200 described in the present disclosure FIGS. 3B and 3C are enlarged cross-sections of edge portions S1, S2 on both sides of the battery module 200.

Referring to FIG. 3A, the battery module 200 may comprise a cell assembly 100 comprising one or more battery cells 110 and a busbar assembly 130 electrically connected to the one or more battery cells 110, a module case 219 comprising an opening part 2199 in which at least a portion of one surface is opened and forming an accommodating space 217 for accommodating the cell assembly 100 therein through the opening part 2199, a module cover 218 (see FIG. 8F) coupled to the module case 219 to close the opening 2199 part, and a filling part 280 (see FIG. 4D) provided between the outside of the busbar assembly 130 and the module case 219 and comprising an electrically insulating material.

In addition, the filling part 280 may further comprise a fire-retardant material.

Therefore, the filling part 280 may comprise or be a single material or a composite material that may have both fire-retardant and electrical insulation properties.

FIG. 3A illustrates an example in which tabs are provided at both ends of the battery cell 110, respectively, and accordingly, the busbar assemblies 130 are also provided at both ends of the battery cell 110, respectively.

Referring to FIG. 3A, the Z-direction is defined as the height direction of the module case 219. In addition, the X-direction, which is one of directions perpendicular to the height direction of the module case 219, was defined as a first direction. The height direction of the module case 219 and a direction perpendicular to the first direction are defined as a second direction.

Accordingly, the one or more battery cells 110 may be disposed along the first direction. If a plurality of battery cells 110 are provided, the plurality of battery cells 110 may be overlapped along the first direction. In other words, the plurality of battery cells 110 may be stacked along the second direction.

The busbar assembly 130 may comprise a first busbar assembly 131 and a second busbar assembly 132 extending along the second direction and electrically connecting both ends of the one or more battery cells 110, respectively.

Referring to FIG. 3A, the module case 219 may comprise an accommodating space 217 for accommodating the cell assembly 100 therein. The module case 219 may be provided in the shape of a cuboid. In addition, the module case 219 may comprise an opening part 2199 in which at least a portion of one surface of the module case 219 is opened, and the cell assembly 100 may be accommodated in the accommodating space 217 through the opening part 2199.

Preferably, one surface of the module case 219 may be opened. This is because a material that can be injected or filled into an empty space after the cell assembly 100 is accommodated in the accommodating space 217 may be a liquid.

Meanwhile, the accommodating space 217 may be located between the busbar assembly 130 and the module case 219, and may comprise a filling space 293 where the filling part 280 comprised or formed of an electrically insulating material is located and a cell accommodating space 291 where the cell assembly 100 is located.

In other words, the accommodating space 217 may be partitioned into the filling space 293 and the cell accommodating space 291.

To this end, the busbar assembly 130 may also serve as a partition plate separating the filling space 293 and the cell accommodating space 291 (shown in FIGS. 3B and 3C). Specifically, in the accommodating space 217, a first space 2931 may be partitioned by the first busbar assembly 131 and a second space 2932 may be partitioned by the second busbar assembly 132.

FIG. 3B illustrates a state in which the first space 2931 and the cell accommodating space 291 are separated by the first busbar assembly 131.

Referring to FIG. 3B, the first busbar assembly 131 may comprise a first busbar 141 electrically connected to the one or more battery cells 110, and a first frame 145 supporting the first busbar 141 in the accommodating space 217.

The first busbar 141 may be electrically connected to tabs provided at both ends of the battery cell 110 to supply power of the battery cell 110 to the outside. Alternatively, the battery cell 110 may be charged through the reverse process. Therefore, the material of the first busbar 141 may be a metal material or a polymer material having electrical conductivity.

The first frame 145 may support the first busbar 141. In other words, when the cell assembly 100 is accommodated in the accommodating space 217, the first frame 145 may be required to support the cell assembly 100 to prevent the battery cell 110 from being excessively moved, and to stably connect the first busbar 141 to the battery cell 110.

In addition, the first frame 145 may be necessary to partition the first space 2931 and the cell accommodating space 291.

Referring to FIG. 3C, the second busbar assembly 132 may comprise a second busbar 161 electrically connected to the one or more battery cells 110, and a second frame 165 supporting the second busbar 161 in the accommodating space 217.

The second busbar 161 may be electrically connected to tabs provided at both ends of the battery cell 110 to supply power of the battery cell 110 to the outside. Alternatively, the battery cell 110 may be charged through the reverse process. Therefore, the material of the second busbar 161 may be a metal material or a polymer material having electrical conductivity.

The second frame 165 may support the second busbar 161. In other words, when the cell assembly 100 is accommodated in the accommodating space 217, the second frame 165 may be required to support the cell assembly 100 to prevent the battery cell 110 from being excessively moved, and to stably connect the second busbar 161 to the battery cell 110.

In addition, the second frame 165 may be necessary to partition the second space 2932 and the cell accommodating space 291.

Meanwhile, after the cell assembly 100 is placed in the cell accommodating space 291, a filler comprised or made of a polymer material may be filled in the cell accommodating space 291. Although the cell accommodating space 291 may not be filled with the filler of a polymer material, in the case of filling the remaining empty space excluding the space occupied by the cell assembly 100 in the cell accommodating space 291 with the polymer material, improvements in heat resistance, flame retardancy, electrical insulation and heat dissipation of the cell assembly 100 can be expected.

In addition, by utilizing a filler having different performance for each space partitioned in the accommodating space 217, the battery module 200 may optimize flame retardancy, electrical insulation, and flame retardancy of the battery module 200 for each space of the battery module 200.

The polymer filled in the cell accommodating space 291 may be in a liquid state, but may be cured into a solid after a predetermined time. Through this, the structural stability of the cell assembly 100 against shock or vibration may be reinforced.

To this end, based on the ASTM D638 (or ISO 527) test method, the elongation of the polymer filled at yield in the cell accommodating space 291 may be considered in the range of about 10% to about 15% in consideration of the impact resistance of the battery cell 110. In addition, based on the ASTM D638 (or ISO 527) test method, the tensile strength of the polymer filled in the cell accommodating space 291 may be 1 MPa or more.

In addition, it is preferable that the polymer filled in the cell accommodating space 291 has an appropriate hardness. Excessive hardness is due to consideration of the brittleness of the polymer filled in the cell accommodating space 291. For example, based on ASTM D2240 test method, the hardness of the polymer filled in the cell accommodating space 291 may be greater than or equal to 5 and less than 100 in the case of the Shore A type and greater than or equal to 5 and less than 80 in the case of the Shore D type.

This may also be applied to the filling part 280. In other words, the first filler 281 and the second filler 282 filled in the first space 2931 and the second space 2932 may have the same or similar properties.

In addition, the curing may be a thermosetting type or room temperature curing type.

Meanwhile, in the present specification, the flame (or fire) retardant material may mean a polymer material having a V-0 grade in the 94V test (vertical burning test) of UL (Underwriter's Laboratory), which is a flame retardant standard for polymer materials.

In some examples, the first filler 281 and the second filler 282 independently may comprise at least one flame retardant polymer and/or at least one flame retardant material. The flame retardant material may comprise at least one of phosphorus-based, halogen-based, and/or inorganic flame retardants, and preferably, in the case of a phosphorus-based flame retardant material, a phosphate compound, a phosphonate compound, a phosphinate compound, a phosphine oxide compound, a phosphazene compound, metal salts thereof, or the like may be included. These may be used alone or in combination of two or more.

As another specific embodiment, the phosphorus-based flame retardant may comprise or be at least one of diphenyl phosphate, diaryl phosphate, triphenyl phosphate, tricresyl phosphate, trixyrenyl phosphate, tri(2,6-dimethylphenyl) phosphate, tri(2,4,6-trimethylphenyl)phosphate, tri(2,4-ditertiarybutylphenyl)phosphate, tri(2,6-dimethylphenyl) phosphate, bisphenol-A bis(diphenyl phosphate), resorcinol bis(diphenyl phosphate), resorcinol bis[bis(2,6-dimethylphenyl)phosphate], resorcinol bis[bis(2,4-ditertiarybutylphenyl)phosphate], hydroquinone bis[bis(2,6-dimethylphenyl)phosphate], hydroquinone bis[bis(2,4-ditertiarybutylphenyl)phosphate], oligomeric phosphoric acid ester-based compound, or the like, but is not limited thereto. These may be applied alone or in the form of a mixture of two or more.

Further, in the present specification, a polymer may be a polymer compound comprising not only a polymer compound but also a solid particle or a filler mixed with the polymer compound. For example, ceramic particles such as alumina, aluminum nitride (AlN), boron nitride (BN), silicon nitride, SiC, ZnO, or BeO may be used. In addition, if the insulating properties of the resin layer can be secured, application of a carbon filler such as graphite may also be considered. The use of such particles or fillers can further improve thermal conductivity, heat resistance, and electrical insulation characteristics of the polymer compound (or polymer).

In addition, in the present specification, a material further comprising a heat-resistant material or a fire-retardant material means a material that does not have a decrease in yield strength or a large deformation at high temperatures. The specifications of the heat-resistant or fire-retardant material may vary depending on the material used and the purpose of use.

In the present specification, the term filling means that a polymer of a desired material enters the inside of the battery module to at least partially or fully fill the empty space.

In addition, the polymer injected as a liquid may cure over time after filling and change into a solid state.

If the state of the material of the polymer used in the heat dissipation part 270 (see FIG. 4B) and the filling part 280 (see FIG. 4D) is liquid, the empty space may be filled through injection or charging. In this case, other components co-located in the corresponding space may be immersed in the liquid. Alternatively, it may be expressed that the other components are encapsulated, enclosed, or contacted by the polymer material.

In addition, in the case of the liquid used in the heat dissipation part 270 and the filling part 280, the volume hardly changes, whereas in the case of a cured type of material used for the heat dissipation part 270 and the filling part 280, the volume may expand due to foaming while curing. Such curable polymer materials may comprise at least one of urethane-based, silicone-based, epoxy-based olefin-based, EVA-based, and/or rubber-based materials.

Meanwhile, the first space 2931 and the second space 2932 may be filled with an electrically insulating material. Accordingly, a material filled in the cell accommodating space 291 may be different from a material filled in the first space 2931 and the second space 2932. The cell accommodating space 291 where the cell assembly 100 is located may be filled with a polymer for improving heat dissipation or thermal conductivity. On the other hand, the polymer filling the first space 2931 and the second space 2932 may comprise an electrically insulating material.

Figure 4A:
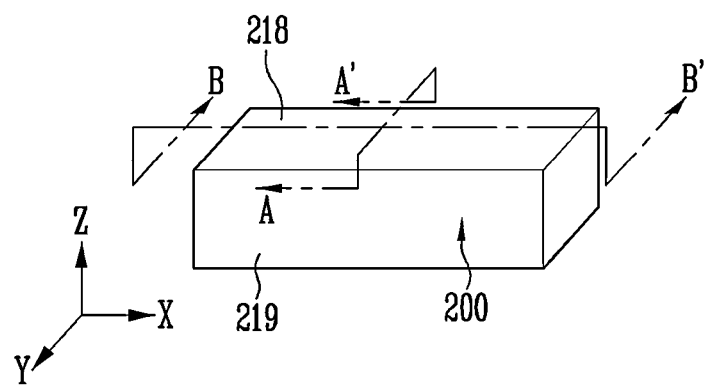
FIG. 4A illustrates an external appearance of the battery module.

FIG. 4A illustrates an example in which the module case 219 and the module cover 218 described in the present disclosure are coupled. Recently, many attempts have been made to lower the center of gravity of battery cells, battery modules, and battery packs used for electric vehicles. This is to prevent the electric vehicle from overturning. To this end, it may be formed to extend longer in one direction than in the other direction from the battery cell, which is a basic unit.

Referring to FIG. 4A, reflecting the above characteristics, the module case 219 may have a length along the first direction (X-direction) longer than a height (Z-direction) of the module case 219 or a length along the second direction (Y-direction). The battery cell 110 and the cell assembly 100 may also extend in the first direction, and may be provided with tabs for being electrically connected to the outside on both sides of the battery cell 110 based on the first direction.

Accordingly, the cell assembly 100 may be provided with a first busbar assembly 131 and a second busbar assembly 132 electrically connected to each tab located at both ends of the battery cell 110. As a result, the first busbar assembly 131 and the second busbar assembly 132 may be disposed to face each other along the first direction.

Figure 4B:
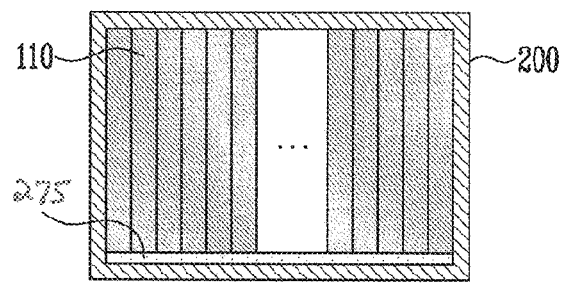
FIG. 4B schematically illustrates a cross-section of the battery module viewed from a an X-direction (A-A').
Figure 4C:
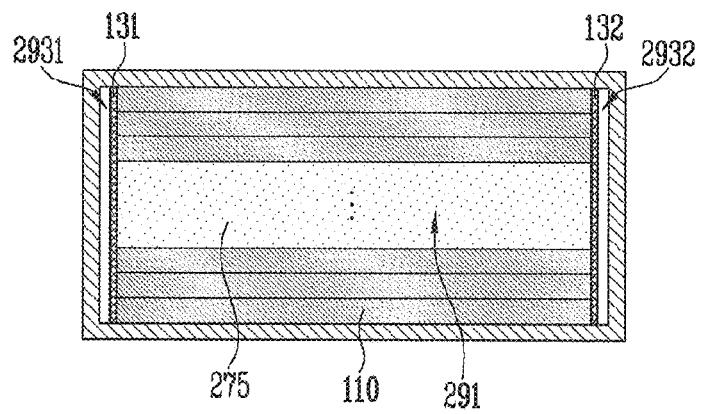
FIG. 4C schematically illustrates a cross-section of the battery module viewed from a Z-direction.

FIG. 4B illustrates a cross-section of the battery module 200 viewed along the first direction (X-direction). FIG. 4C illustrates a cross-section of the battery module 200 viewed along the height direction (Z-direction) of the module case 219.

Referring to FIG. 4B, one or more battery cells 110 may be stacked along the second direction. Accordingly, the one or more battery cells 110 may be disposed to be overlapped along the first direction (X-direction).

The battery module 200 may further comprise a heat dissipation part 270 contacting the cell assembly 100 to dissipate heat from the cell assembly 100.

Referring to FIGS. 4B and 4C, the heat dissipation part 270 may be located at the lower part of the cell assembly 100 and may be in contact with the cell assembly 100. Alternatively, the heat dissipation part 270 may be disposed or applied to the cell accommodating space 291.

The heat dissipation part 270 may be located on the bottom surface of the cell accommodating space 291, i.e., on the module lower panel 213 of the module case 219.

The heat dissipation part 270 may comprise a heat dissipation layer 275 for fixing and supporting the cell assembly 100 by being coupled with the cell assembly 100. The heat dissipation layer 275 may be a layer coated with a heat dissipation adhesive or formed by a heat dissipation pad (not shown).

The material of the heat dissipation part 270 filled in the cell accommodating space 291 comprising the heat dissipation layer 275 may be made of a material having excellent thermal conductivity. Preferably, the material of the heat dissipation part 270 may have a thermal conductivity of 1 W/mK or more. Examples of materials satisfying this comprise acrylic resins, urethane resins, silicone resins, epoxy resins, and olefin resins. Preferably, an epoxy resin or an olefin resin may be used. In addition, as described above, a filler having excellent thermal conductivity may be mixed and used. Preferably, the thermal conductivity of the filler having excellent thermal conductivity may be 1 W/mK (ISO22007-2 standard) or more.

To this end, the material of the heat dissipation part 270 comprising the heat dissipation layer 275 may be an acrylic resin, an epoxy resin, a urethane resin, or an ethylene vinyl acetate (EVA) resin. In particular, the material of the heat dissipation part 270 comprising the heat dissipation layer 275 may comprise a filler having a thermal conductivity function. For example, ceramic particles such as alumina ($Al_2O_3$), aluminum hydroxide, aluminum nitride (AlN), boron nitride (BN), silicon nitride, silicon carbide (SiC), zinc oxide (ZnO) and/or beryllium oxide (BeO) and the like may be used. Further, if the insulating properties of the resin layer can be secured, application of a carbon filler such as graphite can also be considered.

Further, when a thermal adhesive is used for the heat dissipation layer 275, the adhesive strength (or peel strength) of the thermal adhesive may be 50 gf/10 mm or more and 1000 gf/10 mm or less.

In addition, various materials other than the material of the heat dissipation part 270 may be used in combination. This is to consider electrical insulation, heat resistance, etc., together with thermal conductivity. This also applies to the filling part 280. In other words, the filler filling the first space 2931 and the second space 2932 may not be a single component, but may be a complex mixture of various materials for performing various functions.

For example, as described above, the heat dissipation part 270 may contain about 70% or more of acrylic resin, epoxy resin, urethane resin, or ethylene vinyl acetate (EVA) resin, and the rest may be filled with other materials.

The other materials may be added in consideration of not only thermal conductivity, but also flame retardancy, viscosity, dielectric breakdown, surface resistance, and/or volume resistance.

For example, it would be preferable that, based on ISO 3219 or ISO 6721, viscosity of the materials of the filling part 280 and the heat dissipation part 270 satisfies 1 Pa·s or more and 2000 Pa·s or less. This is in consideration of thixotropy and viscosity to prevent leakage.

In addition, it would be preferable that the material of the filling part 280 and the heat dissipation part 270 has a dielectric breakdown voltage of at least 3 kV/mm or more (measured with a 1 mm standard specimen based on ASTM D149).

In addition, it would preferable that the material of the filling part 280 and the heat dissipation part 270 has a surface resistance of $1 \times 10^8$ ohm/sq or more (measured with a 1 mm standard specimen based on ASTM D257).

In addition, the material of the filling part 280 and the heat dissipation part 270 may have a peel strength of 50 gf/10 mm or more. (ASTM D903 standard) or more would be preferable. In addition, the material of the filling part 280 and the heat dissipation part 270 may be 0.5 MPa.

In addition, it would be preferable that the material of the filling part 280 and the heat dissipation part 270 has a volume resistance of 1×108 ohm-cm or more (measured with a 1 mm standard specimen based on ASTM D257).

Figure 4D:
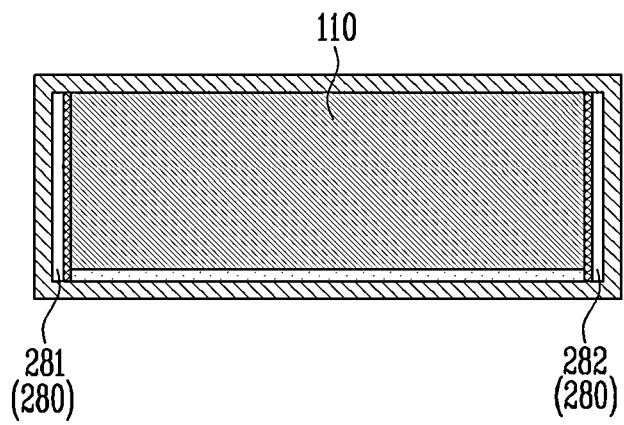
FIG. 4D schematically illustrates another cross-section of the battery module viewed from the Y direction.

FIG. 4D schematically illustrates a cross-section of the module case 219 viewed from the second direction (Y-direction). Referring to FIGS. 4C and 4D, the accommodating space 217 may comprise a first space 2931 and a second space 2932 formed outside the cell assembly 100 formed by being partitioned by the first busbar assembly 131 and the second busbar assembly 132. In addition, the accommodating space 217 may further comprise a cell accommodating space 291 located between the first space 2931 and the second space 2932 to accommodate the cell assembly 100.

The first space 2931 and the second space 2932 may be filled with a first filler 281 and a second filler 282 made of a fire-retardant material, respectively.

Upon thermal runaway of the battery cell 110, the temperature of the cell accommodating space 291 may rise and gas may be generated. The main reason for the generation of the gas is that the electrolyte contained inside the battery cell vaporizes due to the temperature rise. In this case, the first filler 281 and the second filler 282 may prevent the generated gas from moving to the first space 2931 and the second space 2932.

The generated gas may escape to the outside through a discharge hole (not shown) comprised in the module cover 218.

In addition, the first filler 281 and the second filler 282 may comprise or be electrically insulating materials. Thus, other insulating members for electrical insulation between the busbar assembly 131, 132 and the module case 219 may be omitted. This means that the assembly of the battery module 200 can be simplified and the volume occupied by the insulating members can be eliminated to make the battery module 200 more compact than a conventional battery module. This will also be advantageous in terms of reducing the weight of the battery module 200.

Referring to FIGS. 3B, 3C and 4D, the length of the first space 2931 and the length of the second space 2932 may be different based on the first direction.

Figure 5A:
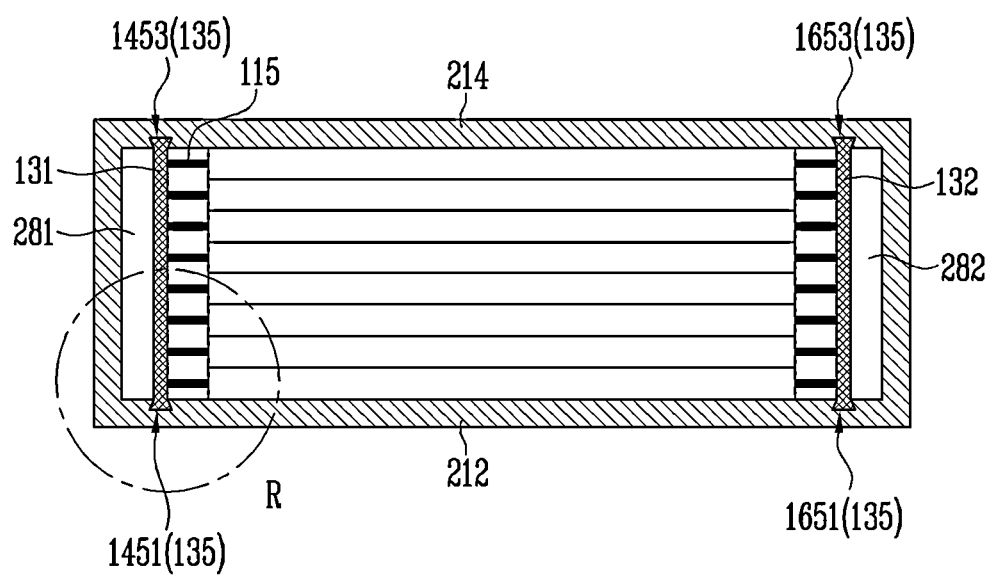
FIG. 5A is a cross-section of the battery module viewed from the Z-direction.
Figure 5B:
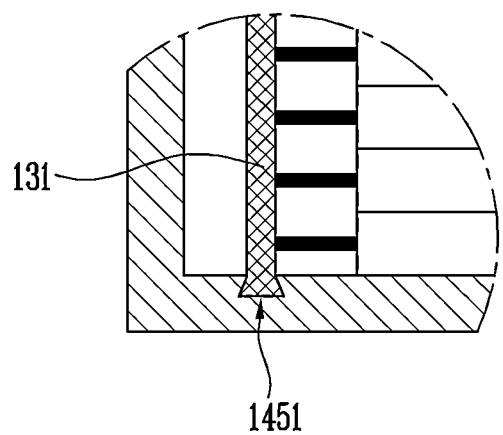
FIG. 5B is an enlarged view of R portion.
Figure 5C:
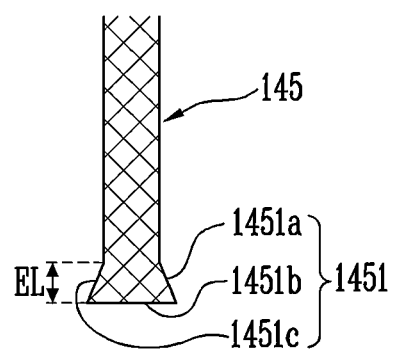
FIG. 5C is an enlarged view of a portion of a first frame coupled to a first bottom groove.

FIG. 5A is a cross-section of the battery module 200 viewed from Z-direction. FIG. 5B is an enlarged view of R portion. FIG. 5C is an enlarged view of a portion of a first frame 145 coupled to a first bottom groove 2195 (see FIG. 7).

Referring to FIGS. 4C and 5A, the filling part 280 may comprise the first space 2931 and the second space 2932, and a first filler 281 and a second filler 282 filled in the first space 2931 and the second space 2932.

The first space 2931 and the second space 2932 may be formed by partitioning a portion of the accommodating space 217 by the first busbar assembly 131 and the second busbar assembly 132, respectively.

Since the cell accommodating space 291, the first space 2931, and the second space 2932 may be filled with polymers of different materials, a gap between the first space 2931 and the cell accommodating space 291, and a gap between the second space 2932 and the cell accommodating space 291 may be sealed or airtight to prevent leakage of the filler into each other space or leakage of gas generated in the event of a fire.

To this end, referring to FIG. 5A, the module case 219 may further comprise a module first side panel 212 and a module second side panel 214 extending from both edges of the module lower panel 213 parallel to the first direction toward the module cover 218, respectively.

In addition, the module first side panel 212 and the module second side panel 214 may comprise a first side groove 2191 (see FIG. 7) and a second side groove 2192 (see FIG. 7) respectively, each of the first side groove 2191 and the second side groove 2192 independently having a predetermined assembly depth EL (see FIG. 5C), and connected to the first bottom groove 2195 (see FIG. 7) to be described later and extending along the height direction of the module case 219, respectively.

In addition, the module first side panel 212 and the module second side panel 214 may comprise a third side groove 2193 (see FIG. 7) and a fourth side groove 2194 (see FIG. 7) respectively, each of the third side groove 2193 and the fourth side groove 2194 independently having an assembly depth EL and connected to the second bottom groove 2197 (see FIG. 7) to be described later and extending along the height direction of the module case 219, respectively.

Similarly, the first frame 145 and the second frame 165 may comprise protruding parts 135 which may be inserted into the side grooves 2191, 2192, 2193, and 2194.

Specifically, the first frame 145 may comprise a first frame first protrusion 1451 and a first frame second protrusion 1453 extending along the second direction by the assembly depth to be assembled to the first side groove 2191 and the second side groove 2192, provided at both ends of the first frame 145 based on the second direction.

The second frame 165 may comprise a second frame first protrusion 1651 and a second frame second protrusion 1653 extending along the second direction by the assembly depth to be assembled to the third side groove 2193 and the fourth side groove 2194, provided at both ends of the second frame 165 based on the second direction.

Accordingly, the lengths of the first frame 145 and the second frame 165 may be longer than the length of the cell accommodating space.

The first frame first protrusion 1451 and the first side groove 2191, the first frame second protrusion 1453 and the second side groove 2192 may be assembled by tight fitting. This is to seal the first space 2931 and the cell accommodating space 291.

Similarly, the second frame first protrusion 1651 and the third side groove 2193, the second frame first protrusion 1651 and the fourth side groove 2194 may be assembled by tight fitting. This is to seal the second space 2932 and the cell accommodating space 291.

In addition, the first frame 145 may further comprise sealing parts (not shown), for example, gaskets, on a surface facing the cell accommodating space and a surface facing the cell accommodating space facing surface. The sealing part may be comprised or formed of an insulating material.

Referring to FIGS. 5B and 5C, the first frame first protrusion 1451 may have a tapered shape. This is to improve the sealing force between the first frame first protrusion 1451 and the first side groove 2191 when coupled. Through this, leakage that may occur between the first space 2931 and the cell accommodating space 291 may be more effectively prevented.

Referring to FIG. 5C, the first frame first protrusion 1451 may extend along the second direction by the assembly depth EL. The first frame first protrusion 1451 may extend obliquely along the second direction, and the thickness of the first frame first protrusion 1451 may increase as the distance from the first frame increases.

The first frame first protrusion 1451 may comprise a first protrusion contact surface 1451c extending along the first direction, and a first protrusion first extension surface 1451*a* and a first protrusion second extension surface 1451*b* extending from both ends of the first protrusion contact surface 1451*c* along the height direction of the module case 219, respectively.

Similarly, the first side groove 2191 will also be provided in a female shape corresponding to the shape of the first frame first protrusion 1451. Accordingly, in the first side groove 2191, the thickness of the first side groove based on the first direction may increase toward the inside of the module first side panel 212 as well.

The description of the first frame second protrusion 1451 and the second side groove 2191 corresponding thereto may be equally applied to the first frame second protrusion 1453 and the second side groove 2192 corresponding thereto, the second frame first protrusion and the third side groove 2193 corresponding thereto, and the second frame second protrusion and the fourth side groove 2194 corresponding thereto.

For example, the first frame second protrusion 1453 may comprise a second protrusion contact surface (not shown) extending along the first direction, a second protrusion first extension surface (not shown) and a second protrusion second extension surface (not shown) extending from both ends of the first protrusion contact surface 1451*c* along the height direction of the module case 219, respectively.

Figure 6A:
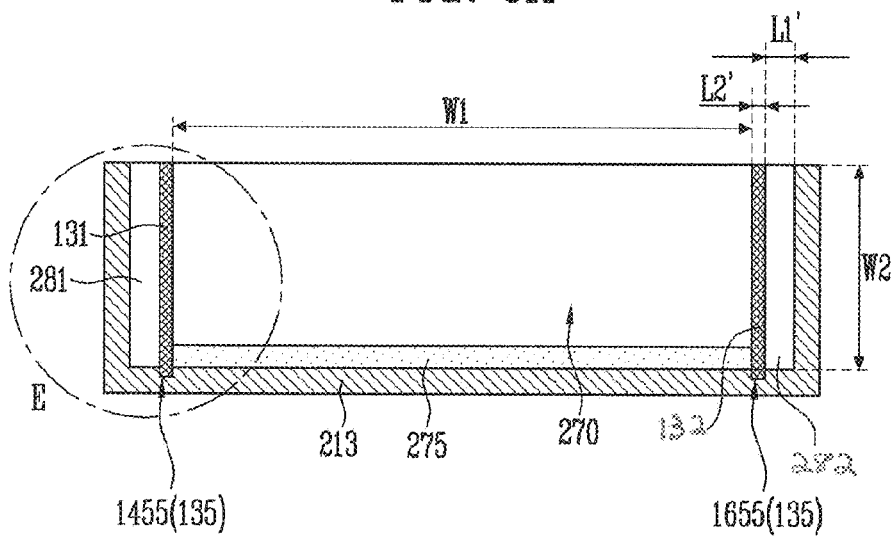
FIG. 6A is a cross-section of the battery module viewed from the Y-direction.
Figure 6B:
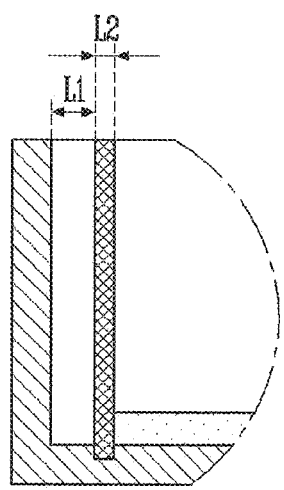
FIG. 6B is an enlarged view of E portion.
Figure 7:
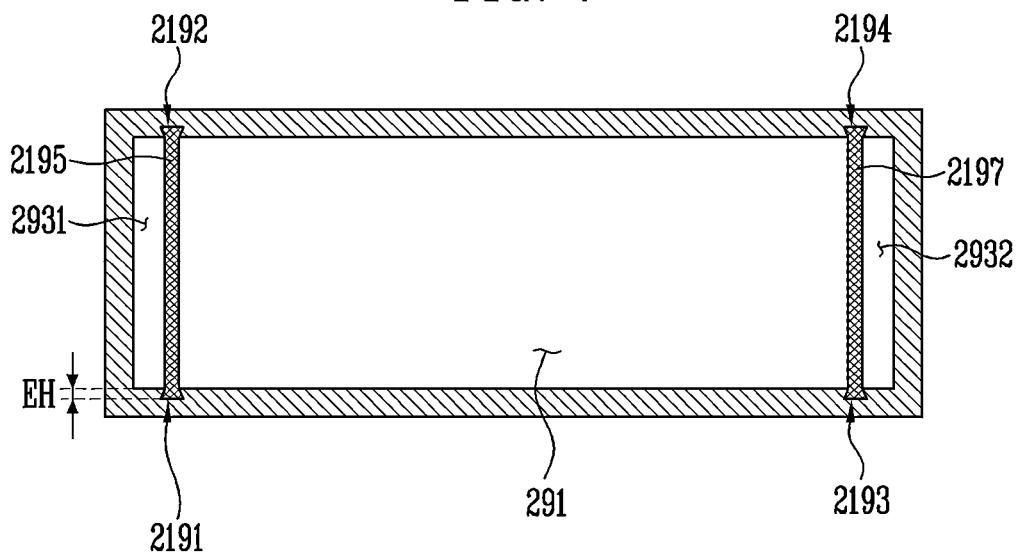
FIG. 7 illustrates a module case viewed from the Z-direction.

FIG. 6A is a cross-section of the battery module 200 viewed from Y-direction. FIG. 6B is an enlarged view of E portion. FIG. 7 is a cross-section of the module case 219 viewed from Z-direction.

Referring to FIGS. 6A and 7, the module case 219 may further comprise a module lower panel 213 forming a bottom surface of the accommodating space 217. The module lower panel 213 may comprise a first bottom groove 2195 and a second bottom groove 2197 in the form of a grooves extending along the second direction and provided in a predetermined insertion length EH.

In addition, the first busbar assembly 131 and the second busbar assembly 132 may be coupled to the first bottom groove 2195 and the second bottom groove 2197, respectively. Specifically, the lower part of the first frame 145 and the lower part of the second frame 165 will be inserted into the first bottom groove 2195 and the second bottom groove 2197, respectively, to be coupled to the module lower panel 213.

The first bottom groove 2195 and the first frame 145 may be coupled by tight fitting for sealing.

Accordingly, the first busbar assembly 131 may be coupled to the first bottom groove 2195, the first side groove 2191, and the second side groove 2192 and fixed. The second busbar assembly 132 may be coupled to the second bottom groove 2197, the third side groove 2193, and the fourth side groove 2194 and fixed.

The lower side surface and both left and right side surfaces of the first frame 145 may be coupled to the first bottom groove 2195, the first side groove 2191, and the second side groove 2192, and fixed. Similarly, the lower side surface and left and right side surfaces of the second frame 165 may be coupled to the second bottom groove 2197, the third side groove 2193, and the fourth side groove 2194, and fixed.

In addition, referring to FIG. 7, the first frame 145 may form the first space 2931 by coupling the lower side surface and both left and right side surfaces of the first frame 145 with the module case 219. In addition, the first frame 145 may seal the first space 2931 from the cell accommodating space 291.

For sealing, the first bottom groove 2195, the first side groove 2191, and the second side groove 2192 will all be connected. In other words, the location of the first bottom groove 2195 in the module lower panel 213, the location of the first side groove 2191 in the module first side panel 212 and the location of the second side groove 2192 in the module second side panel 214 will coincide with respect to the first direction.

This will also be applied to the second bottom groove 2197, the third side groove 2193, and the fourth side groove 2194. In other words, based on the first direction, the location of the second bottom groove 2197 in the module lower panel 213, the location of the third side groove 2193 in the module first side panel 212 and the location of the fourth side groove 2194 in the module second side panel 214 will coincide.

Referring to FIG. 6A, the cell assembly may have a length W1 in the first direction greater than a length W2 of the cell assembly in the height direction and a length in the second direction.

Based on the height direction (Z-direction) of the module case 219, the length of the battery cell 110 may be smaller than the lengths of the first busbar assembly 131 and the second busbar assembly. This is because the first busbar assembly 131 and the second busbar assembly consider the insertion length EH of the first bottom groove 2195 and the second bottom groove 2197.

In addition, referring to FIGS. 6A and 6B, based on the first direction, the length L1 of the first space 2931 filled with the first filler 281 and the length L1' of the second space 2932 filled with the second filler 282 may be different. However, the first filler 281 and the second filler 282 may design the length L1 of the first space 2931 and the length L1' of the second space 2932 in consideration of dielectric breakdown.

For example, in a battery pack that supplies power with a voltage of 800 V (volts) or less, it is preferable to have a dielectric breakdown voltage of about 4 kV or more. Therefore, when the dielectric breakdown voltage of the first filler 281 and the second filler 282 is 2 kV/mm, it would be preferable to design the length L1 of the first space 2931 and the length L1' of the second space 2932 to have a thickness of 2 mm or more, respectively. If the dielectric breakdown voltage of the first filler 281 and the second filler 282 is 4 kV/mm, it would be preferable to design the length L1 of the first space 2931 and the length L1' of the second space 2932 to have a thickness of 1 mm or more. Similarly, when the dielectric breakdown voltage of the first filler 281 and the second filler 282 is 1 kV/mm, it would be preferable to design the length L1 of the first space 2931 and the length L1' of the second space 2932 to have a thickness of 4 mm or more. Of course, the length L1 of the first space 2931 and the length L1' of the second space 2932 may further consider a safety factor for safety.

In the battery pack supplying power with a voltage in excess of 800 V, the length L1 of the first space 2931 and the length L1' of the second space 2932 should be greater than the above-mentioned values.

Therefore, if the materials of the first filler 281 and the second filler 282 are different, the length L1 of the first space 2931 and the length L1' of the second space 2932 may be different.

In addition, based on the first direction, the length L1 of the first space 2931 may be longer than the length L2 of the first busbar assembly 131. Similarly, the length L1' of the second space 2932 may be longer than the length L2' of the second busbar assembly 132.

Referring to FIG. 6A, the cell accommodating space 291 may fill the remaining space except for the space occupied by the cell assembly 100 with a filler comprised or made of a polymer material. At this time, the filler filled in the cell accommodating space 291 will be filled in empty spaces such as between the battery cells 110 and the upper and lower parts of the cell assembly.

Accordingly, the battery module 200 may further comprise a heat dissipation part 270 filled in the cell accommodating space 291.

The heat dissipation part 270 may comprise a heat dissipation layer 275 located in the lower part of the cell assembly 100. The heat dissipation layer 275 may comprise or be formed by a thermal adhesive or may be comprised or formed of a heat dissipation pad.

The heat dissipation part 270 may further comprise a filler filling the remaining empty space after the cell assembly 100 is accommodated in the cell accommodating space 291. The filler filling the cell accommodating space 291 may be a polymer material having excellent heat dissipation properties.

Referring to FIG. 7, the accommodating space 217 may be, based on the first bottom groove 2195 and the second bottom groove 2197, partitioned into a cell accommodating space 291 located between the first bottom groove 2195 and the first bottom groove 2195, a first space 2931 formed between the first bottom groove 2195 and the module case 219 outside the cell accommodating space 291, and a second space 2932 formed between the second bottom groove 2197 and the module case 219 outside the cell accommodating space 291.

The cell accommodating space 291 is strictly a space comprising areas located above the first bottom groove 2195 and the second bottom groove 2197. This is because since the first busbar assembly 131 and the second busbar assembly 132 are coupled to the first bottom groove 2195 and the second bottom groove 2197, and the space where the cell assembly 100 is located comprises both the first bottom groove 2195 and the second bottom groove 2197.

In addition, since the first space 2931 and the second space 2932 are also spaces formed outside the first busbar assembly 131 and the second busbar assembly 132, they will vary depending on the outer shapes of the first busbar assembly 131 and the second busbar assembly 132. However, schematically, the first space 2931 and the second space 2932 may be defined using the first bottom groove 2195 and the second bottom groove 2197.

FIG. 8A to FIG. 8F illustrate an example of an assembly method of a battery module 200 of the present disclosure. The assembly of the cell assembly 100 (see FIG. 8A) and the assembly of the module case 219 accommodating the cell assembly 100 (see FIG. 8B) may be manufactured in parallel. At least a portion of an upper surface of the module case 219 may be opened to stably accommodate a filler to be injected in the future.

In the case of the cell accommodating body 410 of FIG. 1 corresponding to the module case 219 (see FIG. 3) of the present disclosure, since both side surfaces and the upper surface are opened and three panels each coupled thereto must be assembled, the process may take a relatively long time. On the other hand, since only the upper surface of the module case 219 in the present disclosure is open and may be manufactured in the above form in advance, the number of assembly processes is reduced.

Figure 8A:
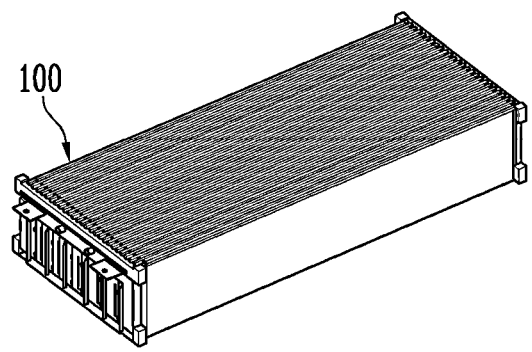
FIG. 8A to FIG. 8F illustrate an assembly method of a battery module described in the present disclosure.
Figure 8B:
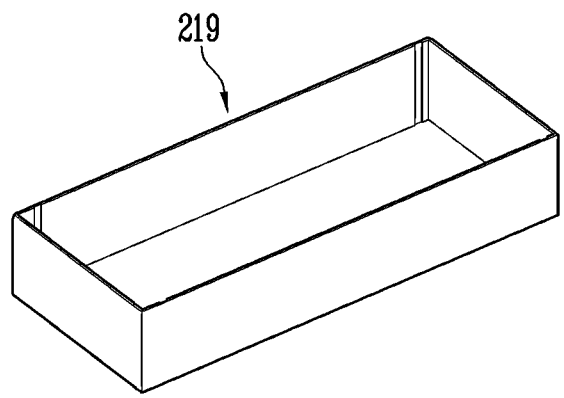
Figure 8C:
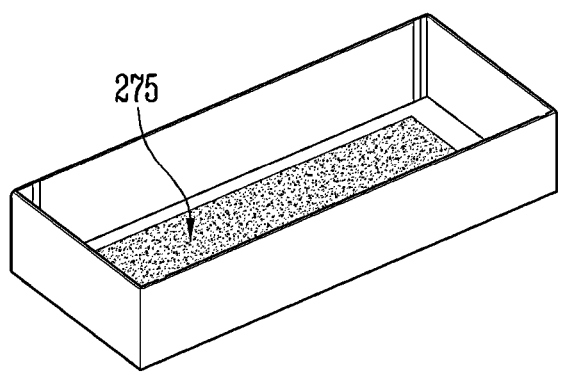

Referring to FIG. 8C, in the assembly method of the present disclosure, a heat dissipation layer 275 may be formed by first applying a thermal adhesive (not shown) to the bottom surface of the cell accommodating space 291.

Figure 8D:
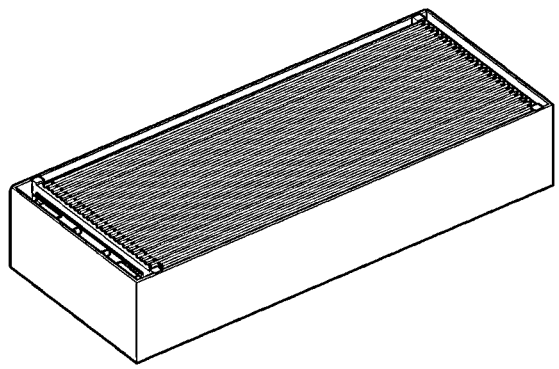

Referring to FIG. 8D, in the assembly method of the present disclosure, the cell assembly 100 may be coupled to the inside of the module case 219 on which the heat dissipation layer 275 is formed. As described above, the first busbar assembly 131 and the second busbar assembly 132 may be inserted into and coupled to the first bottom groove 2195, the second bottom groove 2197, the first side groove 2191, the second side groove 2192, the third side groove 2193, and the fourth side groove 2194.

Figure 8E:
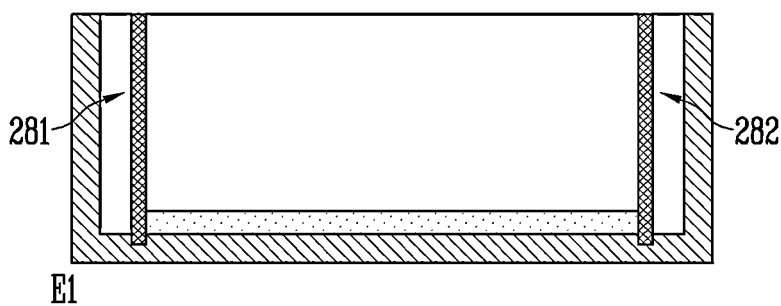

Referring to FIG. 8E, the first filler 281 and the second filler 282 may be filled into the first space 2931 and the second space 2932, respectively. In addition, the cell accommodating space 291 may also be filled with a filler other than the fillers filled in the first space 2931 and the second space 2932.

The cell accommodating space 291 may also be filled with the same fillers as the first filler and the second filler filled in the first space 2931 and the second space 2932.

Figure 8F:
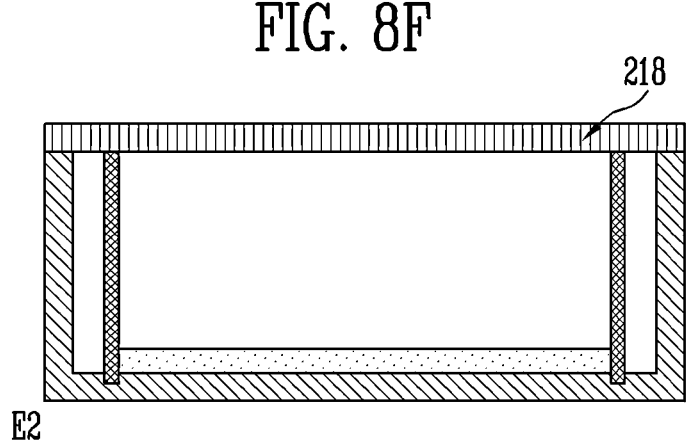

Referring to FIG. 8F, the battery module 200 may be finally completed by coupling the module cover 218 to the module case 219 to close the opening part 2199.

Since the present disclosure may be modified and practiced in various forms, the scope is not limited to the above-described embodiments. Therefore, if a modified embodiment includes elements of the claims of the present disclosure, it should be understood to fall within the scope of the present disclosure.

What is claimed is:

1. A battery module comprising:
a cell assembly comprising one or more battery cells and a busbar assembly electrically connecting the one or more battery cells;
a module case comprising an opening part at least partially opened on one surface, and forming an accommodating space for accommodating the cell assembly therein through the opening part, and comprising a module lower panel forming a bottom surface of the accommodating space, and wherein the module lower panel comprises at least one bottom groove;
a module cover coupled to the module case to close the opening part; and
a filling part which is injected in a liquid state into a filling space between an outside of the busbar assembly and the module case and comprises an electrically insulating material, and
wherein the at least one bottom groove and the busbar assembly are coupled by a tight fitting,
wherein the module case further comprises a module first side panel and a module second side panel extending toward the module cover from both edges of the module lower panel parallel to a first direction, respectively,
wherein the module first side panel comprises at least one side groove extending along the height direction of the module case, and
wherein the module second side panel comprises at least one side groove extending along the height direction of the module case.

2. The battery module of claim 1, wherein the busbar assembly comprises a first busbar assembly and a second busbar assembly which are disposed on both sides of the one or more battery cells along the first direction perpendicular to the height direction of the module case and extend along a second direction perpendicular to the height direction of the module case and the first direction on both sides of the one or more battery cells based on the first direction.

3. The battery module of claim 2, wherein the filling part comprises:
a first filler filled between the module case and the first busbar assembly; and
a second filler filled between the module case and the second busbar assembly.

4. The battery module of claim 3, wherein the accommodating space comprises:
a cell accommodating space in which the cell assembly is located; and
a first space and a second space located outside the first busbar assembly and the second busbar assembly, and in which the first filler and the second filler are located, respectively.

5. The battery module of claim 4, wherein the cell accommodating space is filled with a material different from the first filler and the second filler.

6. The battery module of claim 4, wherein, when gas is generated in the cell accommodating space due to a temperature rise of the one or more battery cells, the first filler and the second filler prevent the generated gas from moving to the first space and the second space.

7. The battery module of claim 4, wherein, based on the first direction, a length of the first space is different from a length of the second space.

8. The battery module of claim 2, wherein a length of the module case extending along the first direction is longer than a height of the module case and a length of the module case extending along the second direction.

9. The battery module of claim 2, wherein the at least one bottom groove comprises a first bottom groove and a second bottom groove extending side by side along the second direction and provided with a predetermined insertion length.

10. The battery module of claim 9, further comprising:
a heat dissipation part located between the first bottom groove and the second bottom groove, and contacting the one or more battery cells.

11. The battery module of claim 10, wherein the heat dissipation part comprises a heat dissipation layer applied on the module lower panel.

12. The battery module of claim 9, wherein the first busbar assembly comprises:
a first busbar electrically connected to the one or more battery cells; and
a first frame supporting the first busbar in the accommodating space, and
the second busbar assembly comprises:
a second busbar electrically connected to the one or more battery cells; and
a second frame supporting the second busbar in the accommodating space, and
wherein lower sides of the first frame and the second frame are provided in shapes corresponding to the first bottom groove and the second bottom groove to be inserted into the first bottom groove and the second bottom groove, respectively.

13. The battery module of claim 12, wherein, based on the first direction, a length of the filling part is greater than a thickness of the first frame and the second frame.

14. The battery module of claim 9,
wherein the at least one side groove of the module first side panel comprises a first side groove and a second side groove, each of the first side groove and the second side groove independently having a predetermined assembly depth and connected to the first bottom groove, each extending along the height direction of the module case, and
wherein the at least one side groove of the module second side panel comprises a third side groove and a fourth side groove each of the third side groove and the fourth side groove independently having an assembly depth and connected to the second bottom groove, each extending along the height direction of the module case.

15. The battery module of claim 14, wherein the first busbar assembly comprises:
a first busbar electrically connected to the one or more battery cells; and
a first frame supporting the first busbar in the accommodating space, and
the second busbar assembly comprises:
a second busbar electrically connected to the one or more battery cells; and
a second frame supporting the second busbar in the accommodating space, and
wherein shapes of both edges of the first frame provided in the height direction of the module case are provided to correspond to shapes of the first side groove and the second side groove so that the first frame is coupled to the first side groove and the second side groove, and
shapes of both edges of the second frame provided in the height direction of the module case are provided to correspond to shapes of the third side groove and the fourth side groove so that the second frame is coupled to the third side groove and the fourth side groove.

16. The battery module of claim 15, wherein each of the first side groove, the second side groove, the third side groove, and the fourth side groove is provided in a tapered shape toward an outside of the module case in the accommodating space.

17. The battery module of claim 1, wherein the filling part further comprises a fire-retardant material.

18. The battery module of claim 1, wherein the one surface of the module case comprising the opening part is an upper surface of the module case.

19. A battery module comprising:
a cell assembly comprising one or more battery cells and a busbar assembly electrically connecting the one or more battery cells;
a module case comprising an opening part at least partially opened on one surface, and forming an accommodating space therein to accommodate the cell assembly through the opening part and comprising a module lower panel forming a bottom surface of the accommodating space, and wherein the module lower panel comprises at least one bottom groove; and
a module cover coupled to the module case to close the opening part,
wherein the accommodating space comprises:
a filling space which is located between the busbar assembly and the module case and in which a filling part injected in a liquid state into the filling space and formed of an electrically insulating material is located; and
a cell accommodating space in which the cell assembly is located, and
wherein the at least one bottom groove and the busbar assembly are coupled by a tight fitting,
wherein the module case further comprises a module first side panel and a module second side panel extending toward the module cover from both edges of the module lower panel parallel to a first direction, respectively, wherein the module first side panel comprises at least one first side groove extending along the height direction of the module case, and wherein the module second side panel comprises at least one second side groove extending along the height direction of the module case.

20. An assembly method of a battery module comprising a cell assembly comprising one or more battery cells and a busbar assembly electrically connecting the one or more battery cells; and a module case forming an accommodating space for accommodating the cell assembly therein together with a module cover and comprising a module lower panel forming a bottom surface of the accommodating space, the assembly method comprising:

disposing a heat dissipation part on a bottom surface of the accommodating space;

positioning the cell assembly in the accommodating space through an opening part in which at least a portion of one surface of the module case is opened;

inserting or injecting a filling part comprising an electrically insulating material in a liquid state into a filling space between an outside of the busbar assembly and the module case; and coupling the module cover to the module case to close the opening part, and wherein the module lower panel comprises at least one bottom groove, and the at least one bottom groove and the busbar assembly are coupled by a tight fitting, wherein the module case further comprises a module first side panel and a module second side panel extending toward the module cover from both edges of the module lower panel parallel to a first direction, respectively, wherein the module first side panel comprises at least one first side groove extending along the height direction of the module case, and wherein the module second side panel comprises at least one second side groove extending along the height direction of the module case.

\* \* \* \* \*